United States Patent Office.

JOHN F. ALEXANDER, OF SHELBY, NORTH CAROLINA, ASSIGNOR TO HIMSELF AND PETER S. MICHIE.

Letters Patent No. 80,798, dated August 11, 1868.

IMPROVED PROCESS OF DESULPHURIZING ORES.

*The Schedule referred to in these Letters Patent and making part of the same.*

TO ALL WHOM IT MAY CONCERN:

Be it known that I, JOHN F. ALEXANDER, of Shelby, in the county of Cleveland, and State of North Carolina, have invented or discovered a new and useful Process of Extracting Gold and other Precious Metals from Sulphurets, of which the following is a full, clear, and exact description.

The object of my invention is to desulphurize the ores of gold, silver, copper, zinc, tin, and other metals.

To this end my invention consists in mixing these ores with carbonaceous material, such as graphite or plumbago, charcoal, or other similar material, (the quantity depending upon the amount of sulphur in the ore,) and heating them, in a closed or sealed retort, to the temperature required.

By this means the carbon unites with the sulphur of the ore, forming the bisulphide of carbon, which is an active reagent in the removal of the rest of the sulphur in the ores, and it continues to act until the ores are freed from sulphur.

After the operation has been completed, the ores will be in a friable condition, and will readily yield up their metals by any of the usual methods of reduction.

The process is not restricted to any peculiar kind of furnace, as the sealed retorts or vessels can be used in any of the well-known gas or reverberatory furnaces.

I have found the process to be very effectual.

What I claim as my invention, and desire to secure by Letters Patent, is—

The method herein described of desulphurizing ores, by exposing them to heat, in a closed vessel or retort, in contact with charcoal, graphite, or other carbonaceous materials.

In testimony whereof, I have hereunto subscribed my name.

JNO. F. ALEXANDER.

Witnesses:
JOHN WILLIAMS,
M. B. TAYLOR.